United States Patent [19]
Bateman et al.

[11] 3,931,422
[45] Jan. 6, 1976

[54] POLYESTER/STARCH PAPER SIZING

[75] Inventors: Mark E. Bateman, Woodridge; Eugene M. Holda, Glen Ellyn, both of Ill.

[73] Assignee: Standard Oil Company, Chicago, Ill.

[22] Filed: Oct. 4, 1974

[21] Appl. No.: 512,109

[52] U.S. Cl. .................. 427/424; 260/9; 427/209; 427/211; 427/428; 427/439; 428/481
[51] Int. Cl.² .... B05D 1/02; C08L 3/02; C09D 3/20
[58] Field of Search ......... 260/9; 428/481; 427/424, 427/428, 439, 209, 211; 117/161 K, 161 C, 165, 155

[56] References Cited
UNITED STATES PATENTS

| | | | |
|---|---|---|---|
| 3,351,604 | 11/1967 | Safford et al. | 260/31.8 |
| 3,650,997 | 3/1972 | Weisfeld et al. | 260/21 |

*Primary Examiner*—Donald E. Czaja
*Assistant Examiner*—Edward Woodberry
*Attorney, Agent, or Firm*—William H. Magidson; Arthur G. Gilkes; William T. McClain

[57] ABSTRACT

Polyester of trimellitic acid compound having an average molecular weight under about 4,000 and an acid number of at least 35 and starch paper sizing composition containing said polyester.

5 Claims, No Drawings

POLYESTER/STARCH PAPER SIZING

This invention relates to paper sizing compositions comprising a hydrophilic natural polymer and a polyester of a polyhydric alcohol and a trimellitic acid compound. More particularly, this invention relates to paper sizing compositions comprising starch and a polyester of a polyhydric alcohol and a trimellitic acid compound.

Paper is often surface-sized with a sizing agent. The sizing agent cements the cellulosic fibers to the body of the paper and to each other, thereby increasing the tensile strength and Mullen value, or burst strength of the paper. Accordingly, the paper can be erased without destroying its fiber structure. Surface sizing also gives paper a relatively smooth, hard film which reduces "feathering" when written upon with pen and ink, will not catch the pen point (or pencil point) when paper is written upon and will not pick if the paper is printed with tacky inks. In addition, the porosity of the paper is decreased since the surface pores of the paper are sealed. Surface sizing is often more important than internal sizing for writing papers, printing papers and certain grades of wrapping paper.

Starch, particularly alkaline-hypochorite-oxidized starch and low D.S. derivatives of starch, such as hydroxyethyl starch ethers and cyanoethyl starch ethers, are the principal surface sizing agents used. While these natural polymers are effective in improving the aforesaid surface properties of paper, paper sized with these agents is often more water sensitive than desired for some uses, particularly for off-set printing, etc. For these uses, it is often necessary to employ mixtures of various latices with the starch to improve the water resistance of the starch-sized surface.

The principal object of this invention is to provide a new surface sizing composition for paper. A more specific object of this invention is to provide a new starch surface sizing composition suitable for application to paper at the size press. Other objects appear hereinafter.

We have now found that the hold-out or water-resistance of paper sizing agents, particularly starch surface sizing agents can be improved markedly by employing surface sizing compositions comprising a natural polymer and water-soluble polyester of a polyhydric alcohol and trimellitic acid compound wherein the polyester has an acid number of at least 35. Applicants believe that the improved surface sizing properties of the starch compositions of this invention is due to the interaction of the polyester having a high acid number with the starch resulting in cross-linking, or further insolubilization of the hydroxyl groups in the starch.

The polyesters useful in this invention are substantially linear and have an average molecular weight under about 4,000. For the most part, these polyesters are of two types. One type contains primarily intralinear pendant-free carboxyl groups while the other contains primarily terminalfree carboxyl and/or anhydride groups. The simplest type of polyester useful in this invention may be viewed as being substantially linear containing intralinear pendant-free carboxyl moieties provided by the trimellitic acid compound. In general, this first class of polyester can be produced by esterifying the trimellitic acid compound (acid or anhydride) with suitable co-monomers (polyhydric alcohols, fatty acids, dicarboxylic acids, etc.) at under 420°F. In this temperature range, the trimellitic acid compound functions as a dicarboxylic acid and substantially each intralinear trimellitic moiety in the polyester has a free caboxyl group.

The second type of polyester is produced by a two-stage cook and can be viewed as having a substantially linear backbone comprising esterified polyhydric alcohol, dicarboxylic acid and possibly some monocarboxylic acid units, having an acid number of about 0 to 25, and sufficient terminal trimellitic groups providing the polyester with an acid number of at least 35, preferably at least 50. These polyesters must be produced by a two-step process wherein (1) substantially all of the polyhydric alcohol moieties (free polyhydric alcohol, polyhydric aocohol esters of monocarboxylic acids, etc.) and carboxylic acid moieties having one or two acyl groups are condensed in the first step to produce a substantially linear polyester having an acid number of about 0 to 25, and (2) substantially all of the trimellitic acid compound, preferably the anhydride, is condensed in the second step with the preformed substantially linear polyester backbone to produce a polyester having an acid number of at least 35.

The two-stage polyesters, particularly those prepared from trimellitic anhydride, are preferred, since these polyesters contain terminal acid groups which are apparently responsible for optimum water-resistance of the sized paper.

In somewhat greater detail, the first stage of the substantially linear backbone polyester having an acid number of about 0 to 25 can be produced by condensing one or more polyhydric alcohol precursors and one or more carboxylic acid precursors having no more than two acyl groups. The hydroxyl:carboxyl equivalent ratio must be at least 1.1:1 in order to provide sufficient terminal or internal hydroxyl groups in the substantially linear polyester for reaction in the second stage with the trimellitic acid compound. After the substantially linear polyester backbone having an acid number of about 0 to 25 is produced, the trimellitic acid compound is condensed in the second stage a water-soluble polyester having an acid number of at least 35.

Typically, the backbone polyester is formed by condensing the reactants at 300° to 500° F. until the polyester has an acid number of about 0 to 25 and then the trimellitic acid compound is reacted in the second stage at 250° to 480° F. until a polyester having an acid number of at least 35 is formed. For best resuluts, alkyds containing glyceride oil moieties should have an acid number of at least 55 and those without glyceride oil moieties preferably have an acid number of at least 70.

The polyester produced by either the one-stage or two-stage process is generally dissolved in water or aqueous medium containing co-solvent or only co-solvent and/or base prior to blending with natural polymers. Suitable co-solvents include alcohols, such as pentanol, diethyleneglycol monomethyl ether, propylene glycol monopropyl ether, etc. Suitable bases include ammonia, morpholine, alkali metal (sodium or potassium) hydroxides, etc.

In general, the preferred polyhydric alcohol precursors suitable for producing the water-soluble polyesters are dihydric alcohols, such as ethylene glycol, 1,2-propylene glycol, trimethylene glycol, neopentyl glycol, hexamethylene glycol, 4,4'-Bis(beta-hydroxypropyl)-Bisphenol A,2,2,4-trimethyl1,3-pentanediol, etc., and the drying or semi-drying glyceride oils, such as soybean oil, linseed oil, corn oil, etc. Various polyhydric alcohols having three or more free hydroxyls, such as glycerol, pentaerythritol, 1,1,1-trimethylol ethane, 1,1,1-trimethylol propane, 1,2,6-hexanetriol, sorbitol, etc., can be used in relatively low proportions. To reduce the possibility of rapid molecular weight built up, it is desirable, when using polyhydric alcohols having more than two hydroxyls, to provide sufficient monocarboxylic acid to provide the polyol with effectively only two free hydroxyl groups per molecule. The dihydric alcohols and polyhydric alcohol esters of monocarboxylic acids having on an average no more than two free-hydroxyl groups per molecular, should constitute at least 90 mole percent of the hydroxyl groups in the polyester backbone to assure that the polyester is substantially linear.

Suitable dicarboxylic acid compounds useful in this invention include isophthalic acid, phthalic acid, phthalic anhydride, terephthalic acid, maleic acid, maleic anhydride, fumaric acid, adipic acid, sebacic acid, succinic anhydride, etc.

The trimellitic acid compound (acid or anhydride) should provide from about 10 to 100 equivalent percent of the acyl groups in the polyester with corresponding 90 to 0 equivalent percent of the acyl groups provided by mono and diacyl compounds.

As indicated above, the trimellitic polyesters of this invention can be used to improve the water-resistance of hydrophilic surface sizes. Suitable starch sizes can be based on corn starch, tapioca starch, waxy corn starch, potato starch, wheat starch and the amylopectin fraction therefrom. Prior to use, these starches are modified, such as by alkaline-hypochlorite-oxidation, acid or enzyme thinning and/or derivatized to a low D.S. (degree of substitution). Suitable derivatives include the so-called hydroxyethyl starches, hydroxypropyl starches, cyanoethyl starches, starch acetates, starch propionates, cyanoethyl starch acetates, aminoethyl starches, etc. having a total D.S. of about 0.005 to 0.20.

In order to be suitable for use in our invention, it is essential that the starch be partially degraded. Partial controlled degradation of the starch decreases the viscosity of the starch paste used in the sizing operation, thereby permitting the use of a higher solids sizing composition. The controlled degradation of the starch also increases the ability of the starch to penetrate the cellulosic fibers and subsequently to bond the surface fibers together. It is this partial degradation of the starch which is at least partially responsible for the relatively poor water-resistance of the sized paper.

There are basically three chemical methods used commercially for degrading starch, namely, enzyme conversion, oxidation with alkaline-hypochlorite or other oxidation agents and acid hydrolysis. In general, the starches of this invention are degraded to a fluidity known in this art of from about 18 to 97 cc, either before or after derivatization, if derivatization is employed. The method of measuring the fluidity is explained below. At this point, it is only necessary to understand that the higher the fluidity of the starch, the greater the degree of degradation of the starch. In order to impart to the paper maximum tensile strength and Mullen burst value when sizing at the size press, it is necessary to use a starch having a fluidity of 75 to 97 cc. A starch having this fluidity (75 to 97 cc) is most suitable for cementing cellulosic fibers to the body of the paper and to each other. Accordingly, the sized paper is more resistant to tearing of fibers during erasing. Further, the higher the fluidity of the starch, the higher the total solids that can be used in the sizing bath. This is particularly important when using the size press. When sizing at the calender stack, less highly degraded (lower fluidity) starches can be used with advantage in order to form a less porous sheet.

The alkaline fluidity of degraded granular starches can be determined in the following manner. Five grams of degraded granular starch (dry solids basis) is placed in a 400 millimeter fluidity beaker containing approximately 100 ccs of starch paste. The composition can be prepared by adding 90 millimeters of 0.25 N sodium hydroxide and 10 millimeters of water to the beaker and the mixture is stirred between 450 and 460 r.p.m. for three minutes. The starch paste is poured into a standard fluidity funnel for a specific "water-time" between about 30 and 40 seconds. The "water-time" is the number of seconds which takes for 100 ccs of water to flow through the funnel. The number of ccs of starch paste which flows through in the water-time is the fluidity of the starch. Typically, undegraded starch has about 1 cc fluidity. The alkaline fluidity of pregelatinized starches or starch pastes can be determined in essentially the same manner by adjusting the solids content and strength of Na OH to produce a 5 percent solids paste containing 0.0225 equivalents of Na OH.

Just prior to use, the granular or pregelatinized starch is slurried in water at the desired concentration (1 to 20 percent by weight). The starch is pasted either by batch means or in a continuous starch cooker (e.g., Votator) at a neutral pH (6 to 8) and then the paste is discharged into the size box and mixed with the trimellitic polyester. A weight ratio of 0.1 to 100 parts by weight, preferably 0.5 to 10 parts by weight, trimellitic polyester solids per each 100 parts by weight starch solids can be used. For the most part, it is desirable to use as low a concentration of polyester as possible. When a size press is employed, the size is applied to the paper while the cellulosic web is moving at 50 to 2,000 feet per minute and then the paper is passed into the nip between two rolls. The size can be applied to the paper by passing the paper through a "puddle" of size maintained by supply from the size box, passing the paper over one roll of the size press partially submersed in size solution, by spraying the size composition onto one or both sides of the paper or by passing the paper web through the size bath.

In somewhat greater detail, the size press consists of two rolls between which the paper travels as it receives the surface sizing solution. In a vertical size press, there are two rolls positioned one above the other. Usually size is sprayed onto the bottom roll of the size press or applied by the bottom roll of the press revolving in a solution of the size. At the same time, a "puddle" of size solution is supplied to the top of the roll, usually by spraying. Normally, a spring roll is located ahead of the press to keep the tension constant and to control the angle at which the paper enters the nip of the press rolls thereby determining the area of the "puddle" supported on the top side of the sheet. The angle is usually about 15°–35°. Lowering the angle increases the area of the "puddle," thereby increasing pick up of the size. On the other hand, raising the angle decreases the area of the "puddle" and the pick up of size by the cellulosic web.

In a horizontal size press, the two rolls are positioned side by side. The size is normally introduced in the nip at the center of the sheet and flows from the center of the sheet toward both ends. Usually each of the two "puddles" formed between one roll surface of the size press and one side of the cellulosic web is kept just large enough to provide a little size running off the ends of the rolls. During the sizing operations, the pH of the size solution can drop to as low as four due to the leaking out of alum from the paper.

Irrespective of how the size is applied at the size press, the cellulosic web passes between rolls in order to drive the size into the paper and to remove excess size. The nip of the size press rolls is adjusted to exert a pressure of 5 to 200 pounds per linear inch. In this way, the penetration of the size into the paper is adjusted to meet the requirements of the paper being sized. Usually, at least one of the size press rolls is non-resilient while the other roll can be resilient (rubber) or non-resilient. The paper is then dried by suitable means. Generally, the water-resistance of the sized paper of this invention develops to a maximum after aging for about a week or two weeks.

If desired, the size composition can be applied to the cellulosic web using an air knife, a trailing blade coater, a Champion knife coater, a calender stack, etc.

The following examples are merely illustrative and should not be construed as limiting the scope of our invention.

EXAMPLE 1

A trimellitic polyester suitable for use in this invention was prepared by adding 652.6 grams isophthalic acid and 361 grams 1,2-propylene glycol to a 2-liter kettle equipped with reflux condenser, thermometers and nitrogen sparge. The composition was heated to 360°F. over a period of about 2 hours. The reactor pot temperature was maintained at about 360° to 480° F. for an additional 12 hours while maintaining the reflux head temperature at below 100° C. to minimize propylene glycol loss and maximize water removal. After the polyester, having an acid number of 6.9, was cooled to 350° F., 125.8 grams trimellitic anhydride was added to the reactor and the reactor temperature was raised from 350° F. to 420° F. over a period of 1 hour to provide a polyester having an acid number of 77.2. The polyester was cooled to room temperature and dissolved in Propasol P(1,2-propylene glycol monopropylether) to form a 70 percent solids solution, neutralized to pH 9 with concentrated ammonium hydroxide and then reduced to 25 percent solids with water.

A 7½ percent solids aqueous starch composition was produced by pasting 50 grams (dry solids basis) granular Penford 280 (a hydroxyethyl starch produced by reacting 2 percent by weight ethylene oxide with starch having a fluidity of 80) with 667 grams water on a stream bath. The starch paste was cooled to 150° F. and mixed with 2.5 grams (dry solid basis) of the polyester prepared in the preceding paragraph. The size composition was placed in the horizontal size bath station of a Keegan coater. Sufficient size composition was applied to both sides of the paper at the nips to provide a slight run-off at each end. The sized paper was then drum dried at 200° F. on a roll dryer providing a contact time of about 40 seconds and the paper was conditioned at 50 percent relative humidity and 73° F. for testing. The paper picked up the equivalent of 100 lbs./ton of starch and 5 lbs./ton of polyester. Paper was also sized in the same manner except thst the polyester was omitted from the size bath.

The water resistance of the paper samples was tested on a Hercules Photosize Tester using a pH 2 blue ink. The number of seconds was recorded when the reflectance on the backside of the treated paper dropped to 80 percent of the value of the untreated paper. The results are set forth below in Table I.

TABLE I

| Sample | As is from size press | Aging of Paper | | |
| --- | --- | --- | --- | --- |
| | | Post Cured 15 Minutes at 105°C. | 1 Week | 2 Weeks |
| Hydroxyethyl starch | 26 sec. | 32 sec. | 30 sec. | 31 sec. |
| Hydroxyethyl starch and polyester | 65 sec. | 75 sec. | 89 sec. | 114 sec. |

The above Example illustrates that the trimellitic polyester improves the water-resistance of starch sized paper and that the water-resistance increases as the paper ages.

Essentially, the same results can be obtained using Staysize 109 (a high fluidity acid hydrolyzed cyanoethyl starch) as the starch.

EXAMPLE II

A polyester useful in this invention based on propylene glycol, maleic anhydride and trimellitic anhydride were prepared in the manner described in Example I. The details are set forth below in Table No. II.

TABLE II

| Example No. | II. | III. | IV. | V. | VI. | VII. |
| --- | --- | --- | --- | --- | --- | --- |
| Reactants | PG/MA/TMA | LO/565/TMA | SO/565/TMA | | SO/TMPD/IPA/TMA | |
| Mole Ratios | 4/1/1.5 | 2.2/6/5 | 2.2/6/5 | 2/4.5/1.3/.5 | 2/6.1/1.4/3.8 | 2/6.1/1.4/3.8 |
| Acid No. | 80 | 55 | 56 | 64 | 72 | 72 |
| Neutralizing Base | TEA | NH₄OH | NH₄OH | NH₄OH | NH₄OH | NH₄OH |
| Cosolvent | None | Isopropanol | Propasol P | Propasol P | Propasol P | Isopropanol |

In the above Table
PG stands for propylene glycol
MA stands for maleic anhydride
TMA stands for trimellitic anhydride
LO stands for linseed oil
565 stands for 4,4'-bis(beta-hydroxypropyl)-Bisphenol A
SO stands for soybean oil
TMPD stands for 2,2,4-trimethyl-1,3-pentanediol
IPA stands for isophthalic acid
TEA stands for triethyl amine

EXAMPLE III

An oil modified polyester was prepared by adding 607.5 grams soybean oil and 658.5 grams of 4,4'-Bis(-beta-hydroxypropyl)-Bisphenol A (Dow 565) to a 2-liter kettle equipped with thermometer, nitrogen sparge and a short air cooled reflux condenser. The composition was heated to 400° F. within 1 hour, at which point 0.24 grams of lithium hydroxide was added as the alcoholysis catalyst. The temperature was raised rapidly to 465°–485° F. and held for 2 hours to achieve good alcoholysis (i.e., ester interchange). The pot temperature was then lowered to 300° F., at which point, 960 grams trimellitic anhydride was charged. The reactor pot temperature was then maintained at about 360°–420° F. for an additional eight hours to provide an oil modified polyester with an acid number of 56. The polyester was cooled to room temperature and dissolved in Propasol P (1,2-propylene glycol monopropylether) to form a 70% solids solution, neutralized to pH 9 with concentrated ammonium hydroxide and then reduced to 30 percent solids with water.

EXAMPLE IV TO VII

A series of oil modified polyesters were prepared in the manner described in Example III. The composition of the polyesters are set forth below in Table II.

The polyesters of Examples II-VII were formulated to provide 1.67 grams polyester per 50 grams starch (dry solids basis) with Penford 280, applied to paper webs at the size press and tested in the manner described in Example I. The paper picked up the equivalent of 150 lbs./ton of starch and 5 lbs./ton of polyester. The Hercules Photosize results are set forth below in Table III.

TABLE III

| Sample | Aging of Paper | | | |
|---|---|---|---|---|
| | As is from size press | Post Cured 15 Min. 105°C. | 1 Week | 2 Weeks |
| Hydroxyethyl starch | 26 sec | 32 sec | 30 sec | 31 sec |
| Ex II | 51 sec | 56 sec | 55 sec | 65 sec |
| Ex III | 29 sec | NOT RUN | 36 sec | 73 sec |
| Ex IV | 34 sec | 55 sec | 52 sec | 94 sec |
| Ex V | 35 sec | 69 sec | 53 sec | 89 sec |
| Ex VI | 33 sec | 57 sec | 52 sec | 85 sec |
| Ex VII | 34 sec | 62 sec | 54 sec | 94 sec |

While this invention is primarily directed to the trimellitic polyesters of this invention and paper-sized with starch compositions containing said polyesters, these compositions can be used advantageously as pigment adhesives at 6 to 20 parts by weight per 100 parts by weight pigment (e.g., clay, satin white, etc.).

We claim:

1. The method of improving the water-resistance of paper which comprises sizing said paper at the size press with a composition comprising degraded starch and a polyester of polyhydric alcohol and a trimellitic acid compound, said polyester having an average molecular weight under about 4,000 and an acid number of at least 35, wherein said polyester is present in a weight ratio of 0.1 to 100 parts by weight per each 100 parts by weight starch solids.

2. The process of claim 1 wherein said polyester contains primarily intralinear free carboxyl groups.

3. The process of claim 1 wherein said polyester has a substantially linear backbone comprising esterified polyhydric alcohol and dicarboxylic acid moieties having an acid number of about 0 to 25 and sufficient terminal trimellitic groups providing the polyester with an acid number of at least 35.

4. The process of claim 3 wherein said starch has a fluidity of about 75 to 97 cc.

5. The process of claim 4 wherein said polyester has an acid number of at least 70.

* * * * *